(12) United States Patent
Götz et al.

(10) Patent No.: US 12,132,183 B2
(45) Date of Patent: Oct. 29, 2024

(54) MECHANICAL AND THERMAL SYSTEM FOR A MODULAR BATTERY WITH POWER ELECTRONICS COMPONENTS

(71) Applicant: Dr. Ing. h.c. F. Porsche Aktiengesellschaft, Stuttgart (DE)

(72) Inventors: Stefan Götz, Forstern (DE); Malte Jaensch, Bietigheim-Bissingen (DE); David Kuhn, Uhingen (DE); Patrick Leidig, Stuttgart (DE); Tim Schmidt, Freiberg am Neckar (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 308 days.

(21) Appl. No.: 16/971,001

(22) PCT Filed: Sep. 13, 2018

(86) PCT No.: PCT/EP2018/025234
§ 371 (c)(1),
(2) Date: Aug. 19, 2020

(87) PCT Pub. No.: WO2019/161876
PCT Pub. Date: Aug. 29, 2019

(65) Prior Publication Data
US 2021/0005855 A1    Jan. 7, 2021

(30) Foreign Application Priority Data

Feb. 20, 2018    (DE) .......................... 102018103713.9

(51) Int. Cl.
*H01M 10/42*    (2006.01)
*B60L 50/64*    (2019.01)
(Continued)

(52) U.S. Cl.
CPC ........... *H01M 10/647* (2015.04); *B60L 50/64* (2019.02); *B60L 58/26* (2019.02); *H01M 10/425* (2013.01);
(Continued)

(58) Field of Classification Search
None
See application file for complete search history.

(56) References Cited

U.S. PATENT DOCUMENTS

| 7,269,037 B2 | 9/2007 | Marquardt | |
|---|---|---|---|
| 2002/0043959 A1* | 4/2002 | Tanaka | H01M 10/63 320/116 |

(Continued)

FOREIGN PATENT DOCUMENTS

| CN | 103580050 A | 2/2014 |
|---|---|---|
| CN | 204335261 U | 5/2015 |

(Continued)

OTHER PUBLICATIONS

International Search Report and Written Opinion for International Application No. PCT/EP2018/025234, dated Dec. 6, 2018, 13 pages.

(Continued)

*Primary Examiner* — Ula C Ruddock
*Assistant Examiner* — Mary Grace Byram
(74) *Attorney, Agent, or Firm* — Buchanan Ingersoll & Rooney PC

(57) ABSTRACT

A method for producing a mechanical and thermal system for a modular battery. The system has a module, which involves a module housing of the module being connected, on a thermally conductive module side, to a cooling apparatus. The module includes an energy storage unit and a power electronics unit, arranged on a circuit board, which are thermally isolated from each other by a first and a second (Continued)

Figure 1:
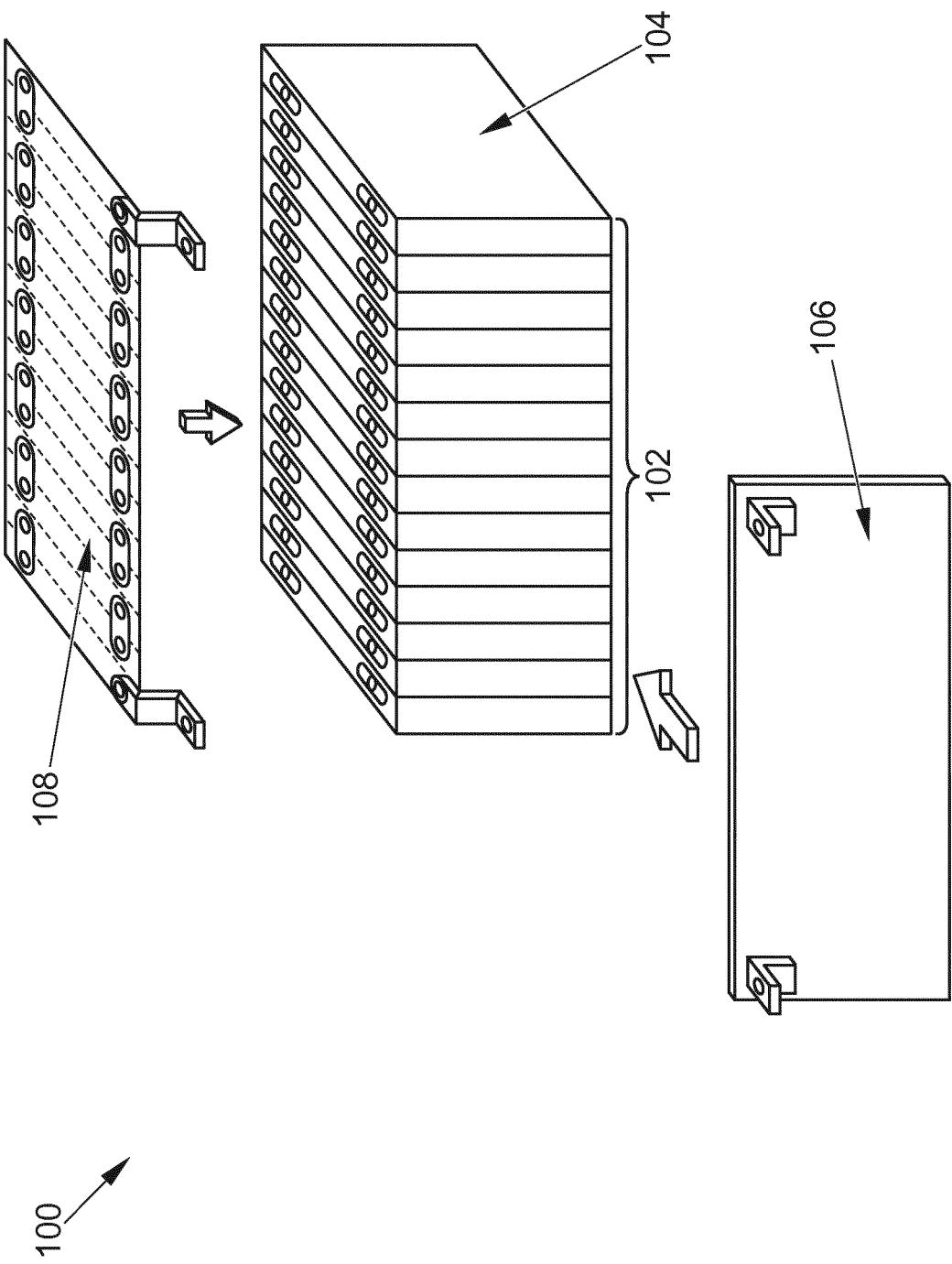

thermally conductive element, which dissipates heat to the module side thermally connected to the cooling apparatus, and are integrated in the module housing, by virtue of the energy storage unit being connected to the first thermally conductive element, which contacts the module side connected to the cooling apparatus, and by virtue of the circuit board and the energy storage unit having the second thermally conductive element arranged between them, which second thermally conductive element contacts the module side connected to the cooling apparatus.

11 Claims, 10 Drawing Sheets

(51) Int. Cl.
| | | |
|---|---|---|
| *B60L 58/26* | (2019.01) | |
| *H01M 10/613* | (2014.01) | |
| *H01M 10/625* | (2014.01) | |
| *H01M 10/647* | (2014.01) | |
| *H01M 10/6554* | (2014.01) | |
| *H01M 10/6556* | (2014.01) | |
| *H01M 10/667* | (2014.01) | |
| *H01M 50/20* | (2021.01) | |
| *H01M 50/209* | (2021.01) | |
| *H01M 50/211* | (2021.01) | |
| *H01M 50/213* | (2021.01) | |
| *H01M 50/284* | (2021.01) | |

(52) U.S. Cl.
CPC ....... *H01M 10/613* (2015.04); *H01M 10/625* (2015.04); *H01M 10/6554* (2015.04); *H01M 10/6556* (2015.04); *H01M 10/667* (2015.04); *H01M 50/20* (2021.01); *H01M 50/209* (2021.01); *H01M 50/211* (2021.01); *H01M 50/213* (2021.01); *H01M 50/284* (2021.01); *H01M 2220/20* (2013.01)

(56) References Cited

U.S. PATENT DOCUMENTS

| | | | | |
|---|---|---|---|---|
| 2008/0050645 | A1* | 2/2008 | Kai | B60L 50/64 |
| | | | | 429/93 |
| 2010/0026090 | A1* | 2/2010 | Nakatsu | B60L 50/61 |
| | | | | 307/9.1 |
| 2011/0045335 | A1* | 2/2011 | Lee | H01M 50/224 |
| | | | | 429/153 |
| 2011/0159340 | A1 | 6/2011 | Hu et al. | |
| 2014/0220391 | A1* | 8/2014 | Fujii | H01M 50/264 |
| | | | | 429/7 |
| 2014/0302363 | A1* | 10/2014 | Miyawaki | H01M 50/271 |
| | | | | 429/163 |
| 2015/0343919 | A1* | 12/2015 | Sakata | H01M 10/613 |
| | | | | 320/109 |
| 2015/0360573 | A1 | 12/2015 | Cimatti et al. | |
| 2016/0093849 | A1* | 3/2016 | DeKeuster | H01M 50/209 |
| | | | | 429/61 |
| 2016/0111692 | A1* | 4/2016 | Morita | H01M 50/209 |
| | | | | 429/96 |
| 2016/0118700 | A1 | 4/2016 | Perumalla et al. | |
| 2017/0133723 | A1* | 5/2017 | Yang | H01M 10/643 |

FOREIGN PATENT DOCUMENTS

| | | |
|---|---|---|
| CN | 106329022 A | 1/2017 |
| DE | 10217889 A1 | 11/2003 |
| DE | 102009035458 A1 | 2/2011 |
| DE | 102011116126 A1 | 5/2012 |
| DE | 102014105123 A1 | 10/2015 |
| DE | 102015219558 A1 | 4/2017 |
| WO | 2017060152 A1 | 4/2017 |

OTHER PUBLICATIONS

Chinese Office Action for Chinese Application No. 201880089669.9, dated Apr. 6, 2022, with translation, 15 pages.

* cited by examiner

MECHANICAL AND THERMAL SYSTEM FOR A MODULAR BATTERY WITH POWER ELECTRONICS COMPONENTS

CROSS-REFERENCE TO RELATED APPLICATIONS

This application is the U.S. National Stage filing of International Appln. No. PCT/EP2018/025234, filed Sep. 13, 2018, which claims priority to German Application No.: DE 10 2018 103 713.9, filed Feb. 20, 2018, the entirety of which applications is incorporated herein by reference for all purposes.

FIELD OF THE INVENTION

The present invention relates to a method for producing a mechanical and thermal system for a modular battery that has energy stores and power electronics components in modules of the same type. Further, the mechanical and thermal system for the modular battery is claimed. Furthermore, a module comprising the system is claimed. Finally, a modular battery comprising the system and the module is claimed. The modular battery is situated in the surroundings of the electrical power supply for a drive of an electric vehicle, for example.

BACKGROUND OF THE INVENTION

Power electronics, such as e.g. a modular multilevel converter, for example described in DE 102 17 889 A1, can be used to split otherwise hardwired battery packs into multiple modular battery parts, the electrical interconnection of which can be altered dynamically during operation. A modular battery part can consist of individual battery cells, or else of multiple battery cells that themselves again form a small battery pack. The dynamic reconfiguration allows faulty battery cells to be bypassed or any output voltages to be produced. One problem is that both power electronics and battery cells are a respective heat source that requires cooling.

The document DE 10 2011 116 126 A1 discloses a battery having actively temperature-controlled individual battery cells and components that are arranged on the outside of a battery housing and thermally coupled to the battery housing.

The US document US 2016/0118700 A1 discloses heat transfer through the use of a thermal plate between the battery cells and the battery electronics.

In batteries having integrated power electronics, there are two heat sources, in contrast to conventional battery designs known from the prior art. Firstly, the battery cells heat up both during a charging process and during a discharge process (during the driving mode) on account of their non-negligible internal resistance. The battery cooling system determines the power of an electric vehicle, using a central measure. Often, a liquid is used, which even uses an air conditioning compressor to cool the batteries to room temperature. In this regard see also the US document US 2015/0360573 A1, for example, which describes cooling of chemical battery packs and power electronics inside a common housing by means of a cooling liquid system. Secondly, the power electronics for their part conduct large currents (for example the whole battery current) through components of the battery electronics, which produces additional forward and/or switching losses.

Further, the typical operating temperature ranges of the power electronics and the battery differ. Batteries today, such as lithium-based or zinc-based batteries, prefer ideal operating temperatures that for the most part range from approximately just above 0° Celsius to approximately 40° Celsius. In general, operation at room temperature is preferred. By contrast, the operating temperature range of electronic components is significantly wider. As such, they can be operated far below 0° Celsius, in the case of semiconductors at least down to −20° Celsius. At the upper end, temperatures of more than 120° Celsius are permitted, which means that for example a package temperature of above 100° Celsius is possible.

In addition, a power loss from the battery is dominated by the comparatively large surface thereof. Much lower is the power loss occurring at the power electronics, which can be less by a factor of 5 to 10 than in the case of the battery, but is very much concentrated on the power electronics components.

Equally, the battery with its high mass and its large volume has a high thermal capacity, while the thermal capacity of the power electronics is in truth extremely low in comparison.

SUMMARY OF THE INVENTION

Against this background, it is an object of the present invention to provide a method for producing a thermal and mechanical system for a modular battery that integrates power electronics and energy stores in modules of the same type, thermally insulates the respective heat sources from one another and allows respective cooling of said heat sources. In addition, control electronics are also supposed to be integrable. Furthermore, it is an object of the present invention to provide a corresponding thermal and mechanical system produced using the method according to the invention and to provide a battery module comprising the system.

To achieve the aforementioned object, a method for producing a thermal and mechanical system for a modular battery is proposed, the system having at least one module, which involves a box-like module housing of the module being connected, on at least one thermally conductive module side, to at least one flat cooling apparatus, wherein the module comprises at least one energy storage unit and at least one power electronics unit, arranged on a flat power electronics circuit board, which are thermally isolated from one another by at least one first and at least one second thermally conductive element, which dissipate heat to the at least one module side thermally connected to the cooling apparatus, and are integrated in the module housing, by virtue of the at least one energy storage unit being connected to the at least one first thermally conductive element, which has contact made with it by the at least one module side connected to the cooling apparatus, and by virtue of the at least one flat power electronics circuit board being arranged between the at least one energy storage unit and a housing interior wall of the module housing, and by virtue of the at least one flat power electronics circuit board and the at least one energy storage unit having the at least one second thermally conductive element arranged between them, which second thermally conductive element has contact made with it by the at least one module side connected to the cooling apparatus.

In one embodiment of the method according to the invention, at least two energy storage units are combined to form a battery module in which they are arranged adjacently and connected up in series with one another. Alternatively, it is conceivable for the individual energy storage units to be connected to one another via controllable switches, as a result of which a parallel or mixed series-parallel configuration of the energy storage units can be set or as a result of which individual energy storage units can be skipped or bypassed, for example if they are faulty.

In another embodiment of the method according to the invention, the energy storage unit chosen is either at least one battery cell in the form of a prismatic cell or at least one battery cell in the form of a round cell or at least one battery cell in the form of a pouch cell.

In one embodiment of the method according to the invention, at least one thermally insulating element is arranged in the module housing, wherein the interaction of the at least one first thermally conductive element, the at least one second thermally conductive element and the at least one thermally insulating element results in at least one cooling path that dissipates heat produced in the module housing to the module side connected to the cooling apparatus. This can allow cooling paths that are common but do not influence one another, which means that the power electronics unit, which may be at a high temperature, does not place a thermal load on the at least one energy storage unit. According to predetermined requirements, cooling paths can also be coupled by virtue of a thermal connection being made between the power electronics unit and the at least one energy storage unit by means of materials having high thermal conductivity, such as for example metals, and thermal insulators, such as for example plastics, foams or else air. The heat produced by the power electronics unit or the at least one energy storage unit during operation is taken away to the at least one module side connected to the cooling apparatus.

In another embodiment of the method according to the invention, the at least one second thermally conductive element is designed in the form of thermally conductive plates and a top and a bottom of the flat power electronics circuit board are each surrounded by a thermally conductive plate. The respective thermally conductive plate has contact made with it by the at least one module side connected to the cooling apparatus.

In yet another embodiment of the method according to the invention, a module base is chosen as one of the at least one module sides connected to the cooling apparatus.

In one embodiment of the method according to the invention, the power electronics unit chosen is a modular multilevel converter.

In another embodiment of the method according to the invention, a control electronics unit that is in the form of a flat control circuit board and is arranged opposite or at right angles to the power electronics circuit board along a housing interior wall of the module housing is additionally integrated in the module housing. As a result, the control electronics unit can interact with the power electronics unit within one and the same module housing without being adversely affected by the strong electromagnetic fields of said power electronics unit.

The method according to the invention therefore mechanically and thermally integrates the power electronics unit and at least one energy storage unit, and optionally also the control electronics unit, in one module, which can usually be arranged on the cooling apparatus in multiple embodiments.

Furthermore, a mechanical and thermal system for a modular battery that has energy stores and power electronics components in modules of the same type is claimed, wherein the system comprises at least one module having a box-like module housing that is connected, on at least one module side, to a flat cooling apparatus, wherein the at least one module has at least one energy storage unit, a power electronics unit arranged on at least one flat power electronics circuit board, and at least one first and at least one second thermally conductive element, wherein in each case the at least one energy storage unit is connected to the at least one first thermally conductive element and the latter has contact made with it by the at least one module side connected to the cooling apparatus, and wherein the at least one flat power electronics circuit board is arranged between the at least one energy storage unit and a housing interior wall of the module housing, and the at least one flat power electronics circuit board and the at least one energy storage unit have the at least one second thermally conductive element arranged between them, which second thermally conductive element is coupled to the at least one module side connected to the cooling apparatus.

The module housing is made up of a U-shaped three-sided sheet metal bent part having two milled or injection molded connecting parts arranged on two open sides of the U-shaped sheet metal bent part and a housing cover placed thereon, for example. The respective thermally conductive element can be in the form of a flat thermally conductive plate that is connected to the cooling apparatus of the module via the module side that is connected to the cooling apparatus. In the case of a module housing filled with at least one energy storage unit, the at least one power electronics circuit board can be arranged at the side of the at least one energy storage unit along a housing interior wall. The at least one power electronics circuit board and the at least one energy storage unit can have at least one thermally conductive plate formed flat between them as the at least one second thermally conductive element. Additionally, the at least one power electronics circuit board and a housing interior wall of the module housing can have a further thermally conductive plate formed between them. The respective thermally conductive plate is connected at one edge to the module side that is connected to the cooling apparatus, or to the housing interior wall of the module housing that is to be associated with this module side, an outer side of the module housing that is associated with the housing interior wall being in contact with the cooling apparatus. For example, this can be the module base.

In another configuration of the mechanical and thermal system according to the invention, the system additionally has at least one thermally insulating element that, together with the at least one first thermally conductive element and/or with the at least one second thermally conductive element, forms at least one cooling path on which heat is dissipated to the cooling apparatus.

In yet another configuration of the mechanical and thermal system according to the invention, the system has either at least one battery cell in the form of a prismatic cell or at least one battery cell in the form of a round cell or at least one battery cell in the form of a pouch cell as an energy storage unit. For example, the prismatic cell may be provided with bolt or weld connections.

In one configuration of the mechanical and thermal system according to the invention, the power electronics unit is a modular multilevel converter. A modular multilevel converter usually has a plurality of power semiconductor switches that, during operation, along with supplying current and taking current away, form a high heat source, while an associated controller of the power semiconductor switches carries only low current and therefore hardly any heat loss occurs.

In another configuration of the mechanical and thermal system according to the invention, the system additionally comprises a control electronics unit in the form of a flat control circuit board. The control circuit board may be shielded from electromagnetic interference by a shielding plate or a shielding film, for example arranged on a cell connector frame connecting multiple energy storage units.

Finally, a battery module equipped with the mechanical and thermal system according to the invention and a modular battery comprising at least one such battery module are claimed.

Further advantages and configurations of the invention become apparent from the description and the accompanying drawing.

It goes without saying that the features cited above and those yet to be explained below are usable not only in the particular indicated combination but also in other combinations or on their own without departing from the scope of the present invention.

BRIEF DESCRIPTION OF THE DRAWING FIGURES

The figures are described cohesively and in an all-embracing manner; identical components have the same associated reference signs.

FIG. 1 uses a schematic depiction according to an embodiment of the method according the invention to show an arrangement of multiple prismatic energy cells or battery cells for fitting in a module housing provided according to the invention.

Figure 2:
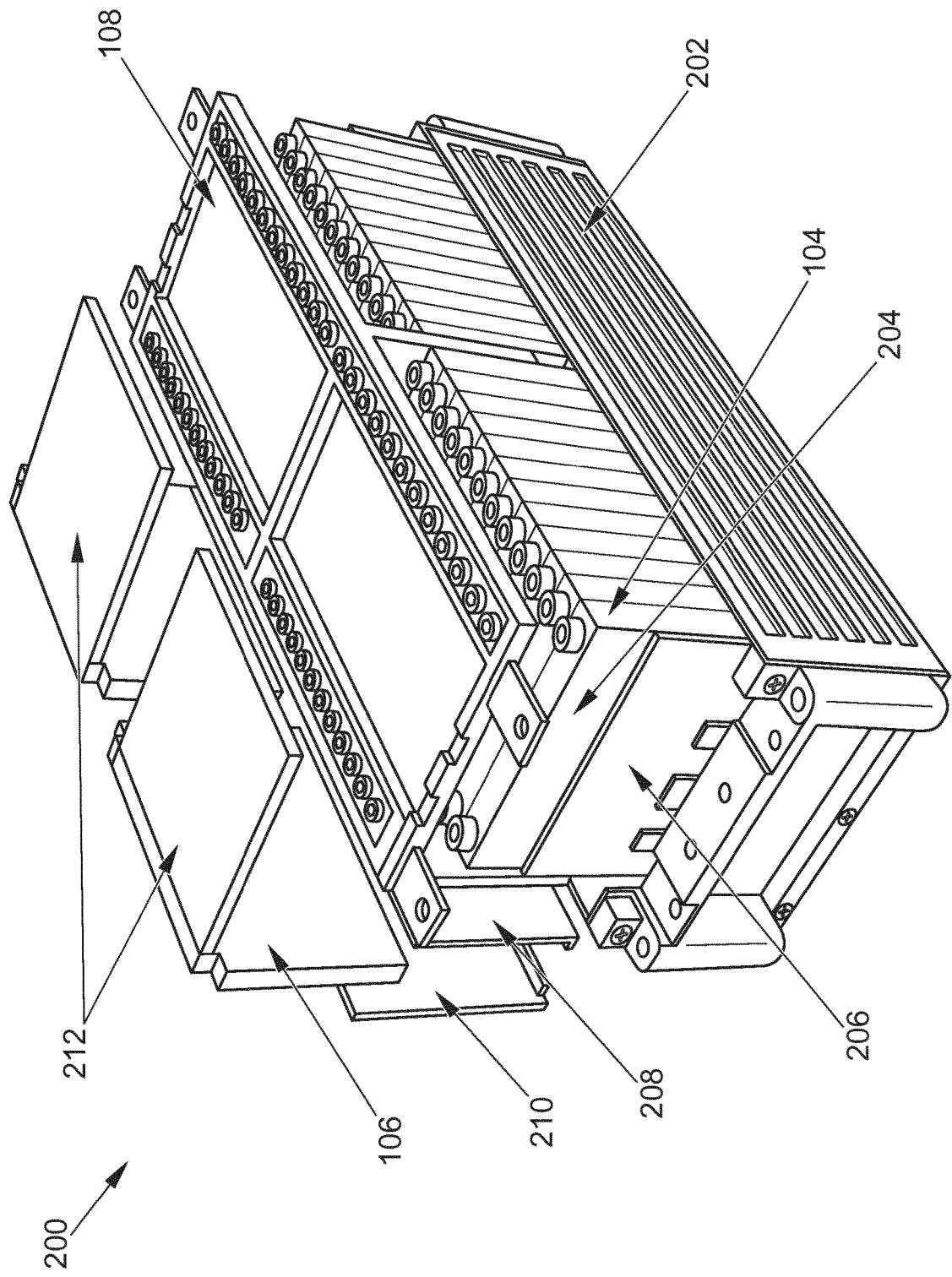

FIG. 2 uses a schematic depiction according to the embodiment of the method according to the invention to show a collection of subassemblies to be installed.

Figure 3:
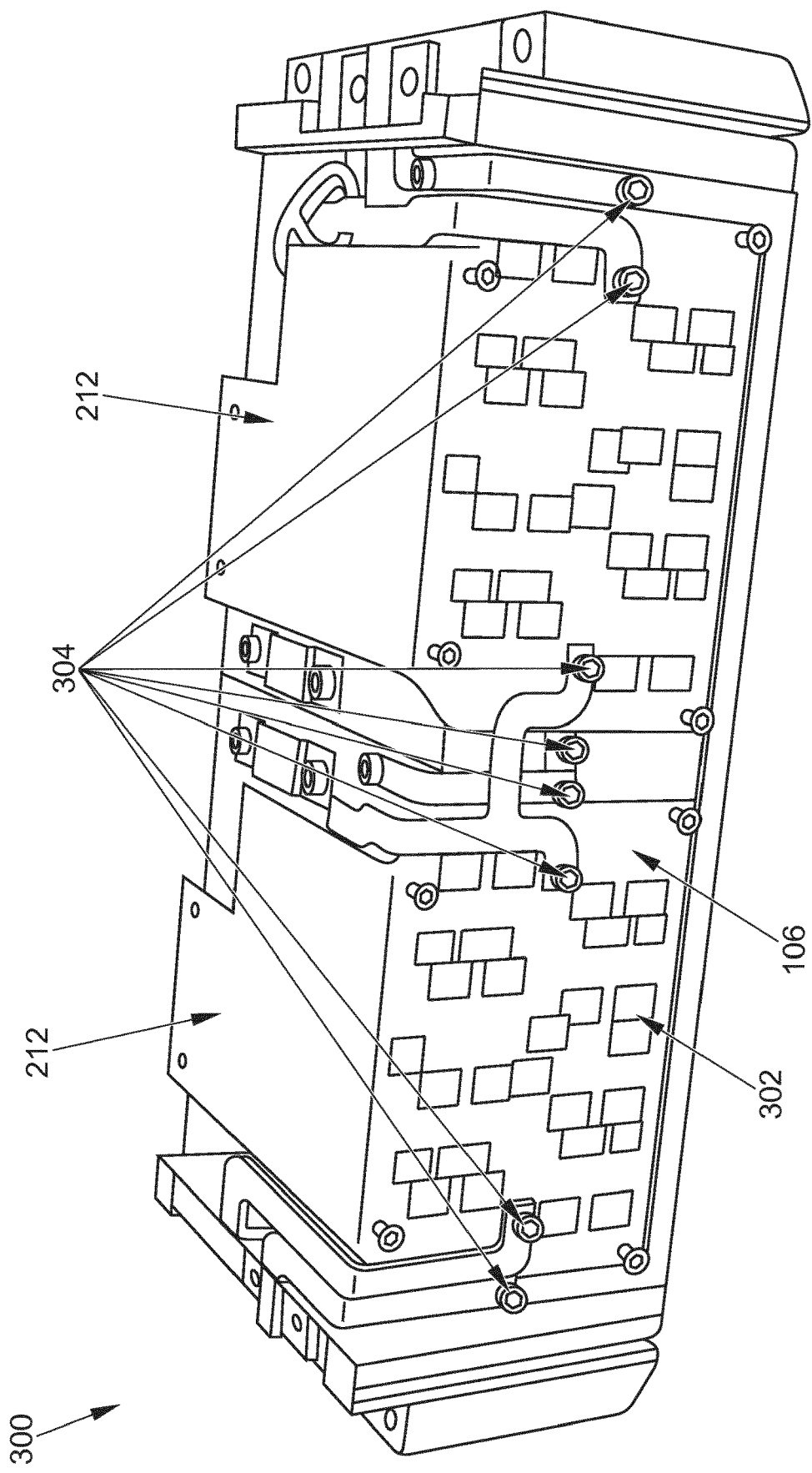

FIG. 3 uses a schematic depiction according to the embodiment of the method according to the invention to show an assembly section for bolting together conductors and a power electronics circuit board.

Figure 4:
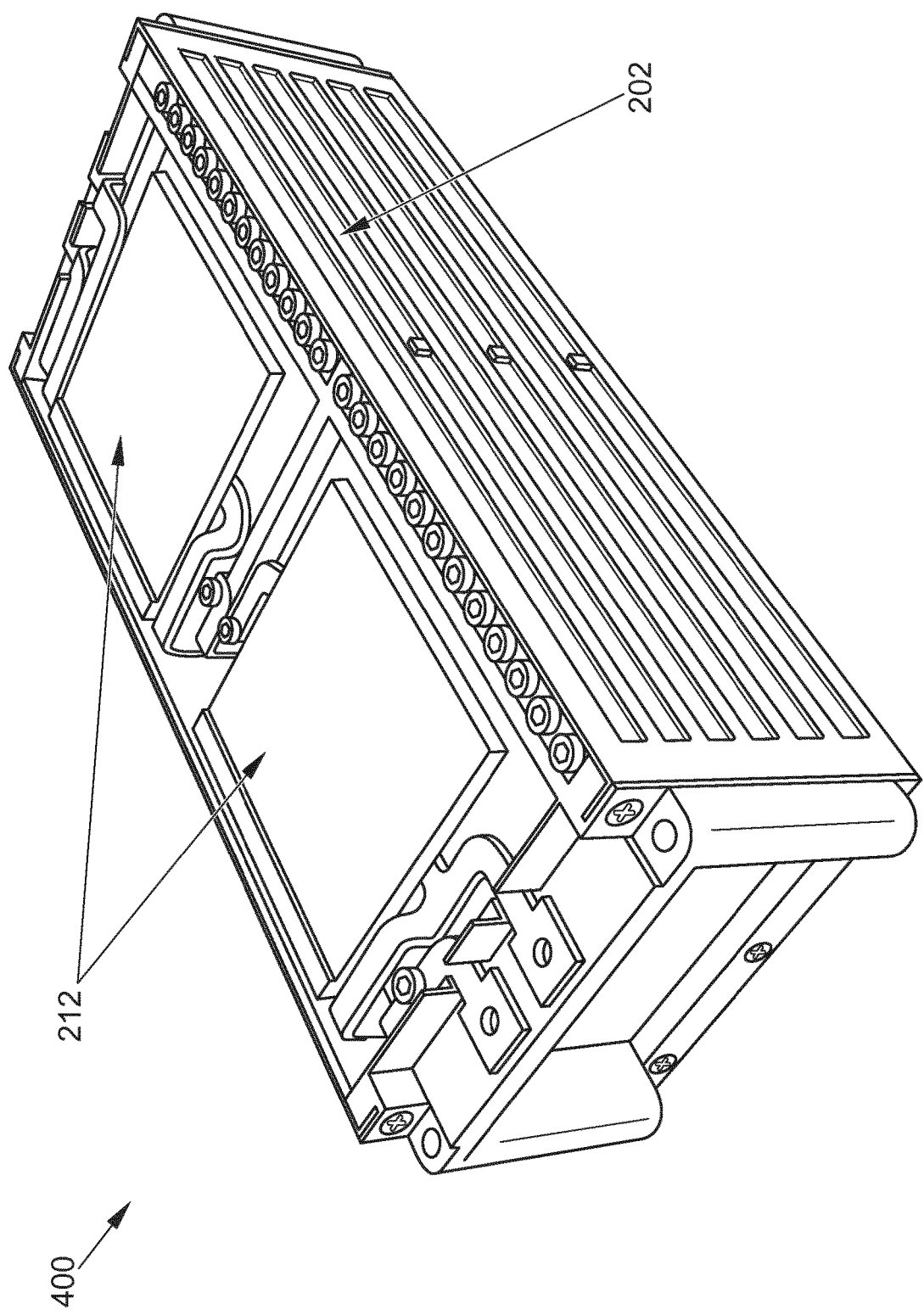

FIG. 4 uses a schematic depiction according to the embodiment of the method according to the invention to show an assembly section with integration of energy cells and circuit boards of a power electronics unit and a control electronics unit in the module housing provided according to the invention.

Figure 5:
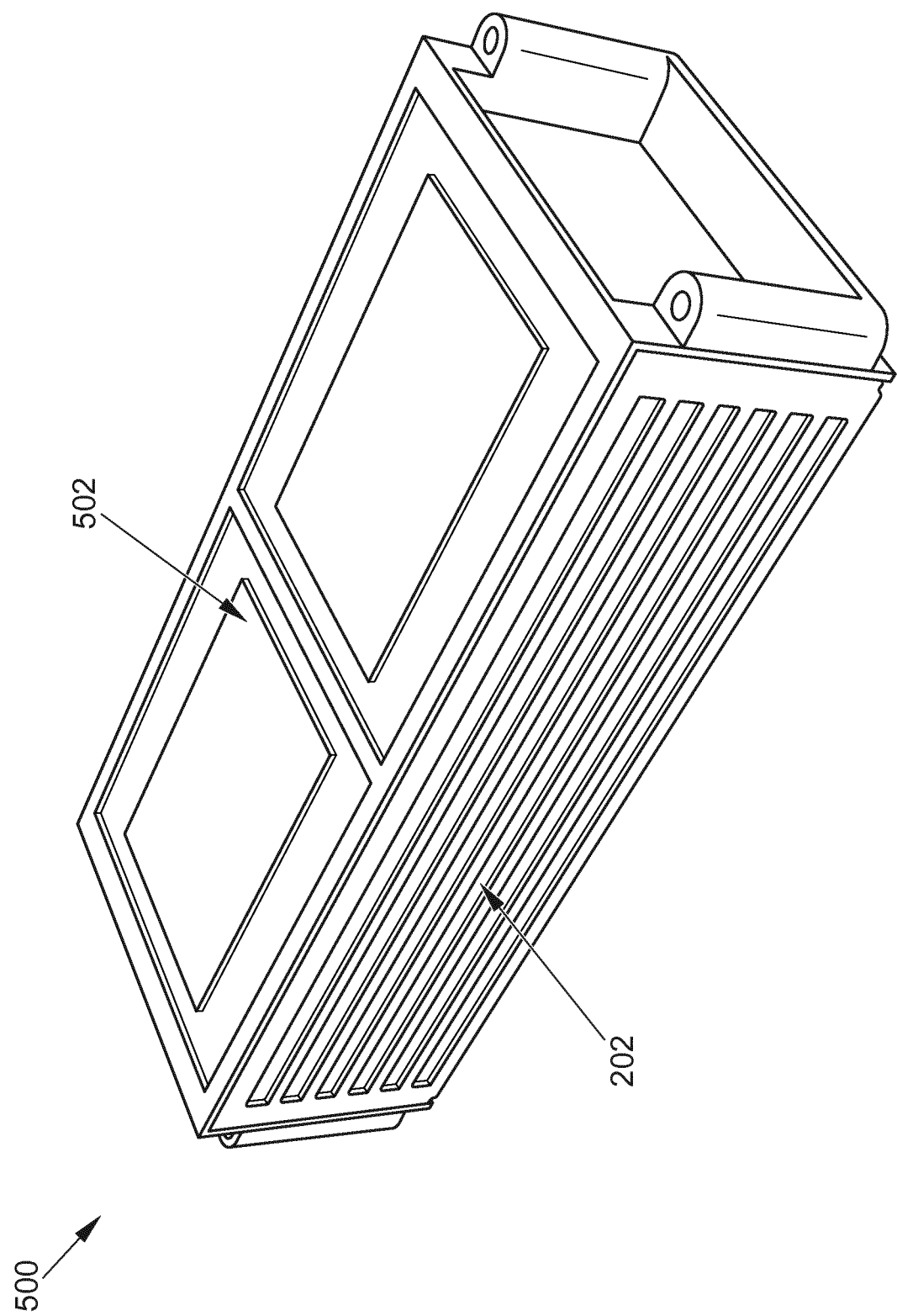

FIG. 5 uses a schematic depiction according to the embodiment of the method according to the invention to show a resultant assembled module according to the invention.

Figure 6:
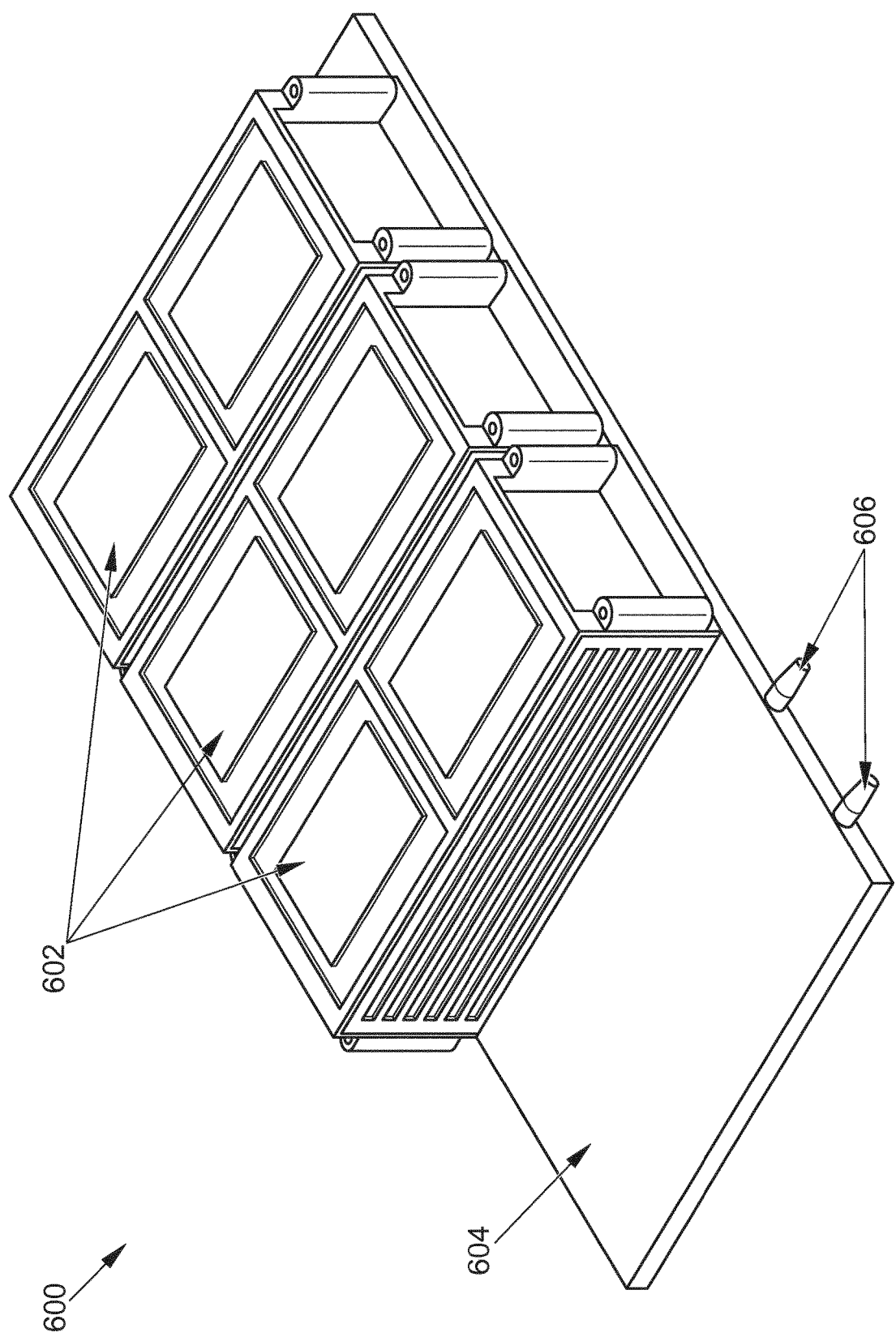

FIG. 6 uses a schematic depiction according to the embodiment of the method according to the invention to show multiple modules according to the invention arranged on a cold plate.

Figure 7:
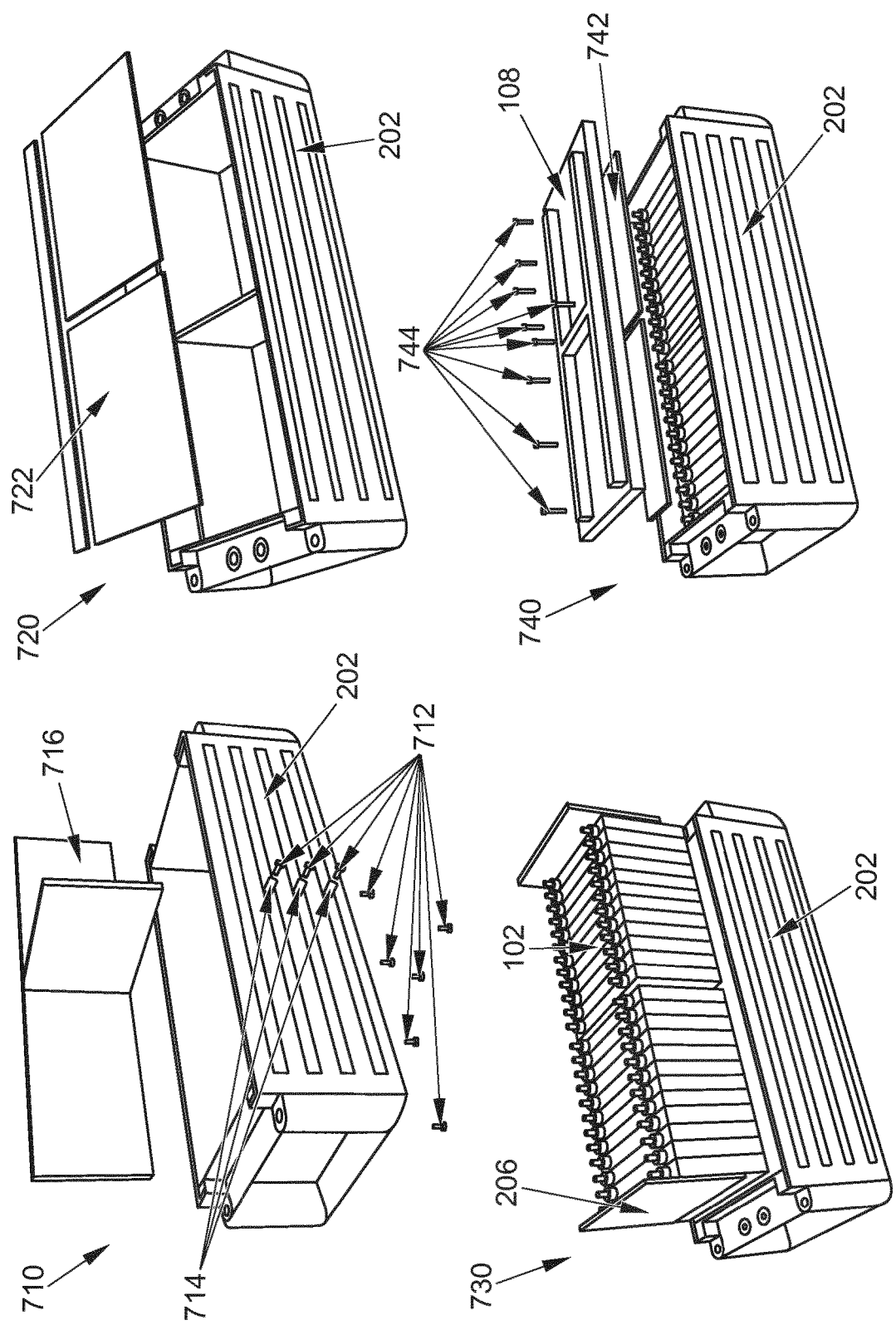

FIG. 7 uses a schematic depiction according to the embodiment of the method according to the invention to show a first course of assembly for assembling the module according to the invention.

Figure 8:
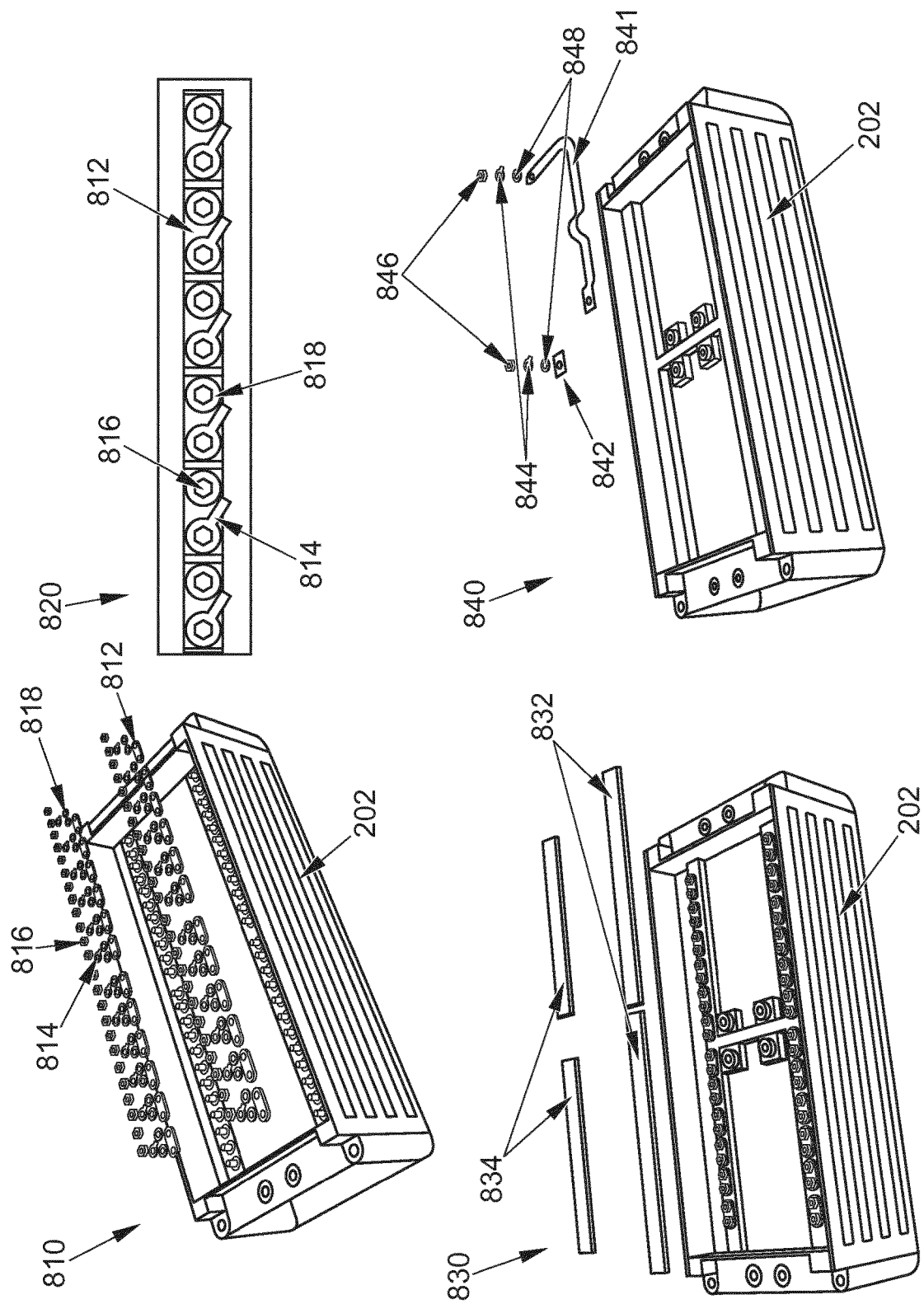

FIG. 8 uses a schematic depiction according to the embodiment of the method according to the invention to show a second course of assembly for assembling the module according to the invention.

Figure 9:
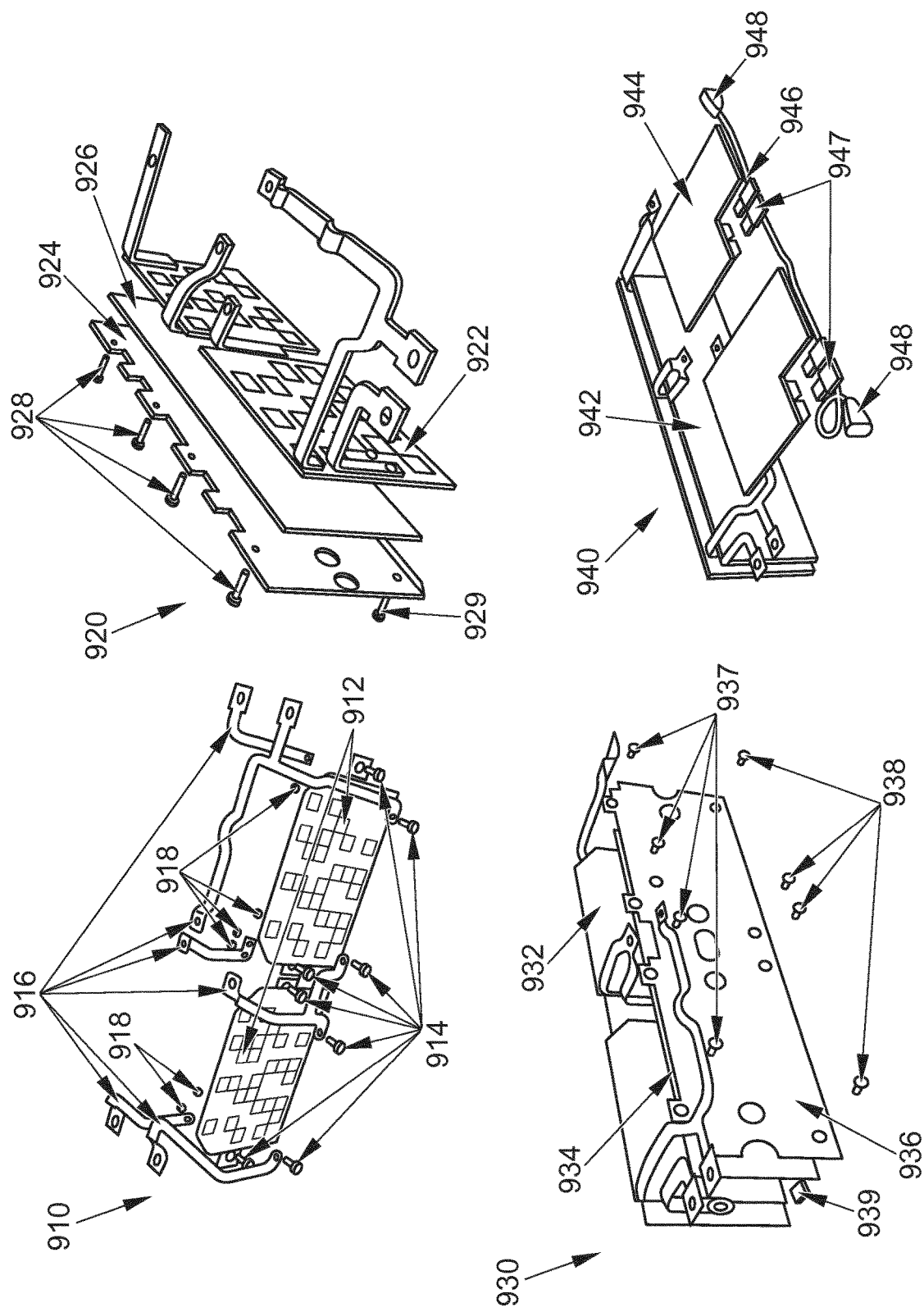

FIG. 9 uses a schematic depiction according to the embodiment of the method according to the invention to show a third course of assembly for assembling the module according to is the invention.

Figure 10:
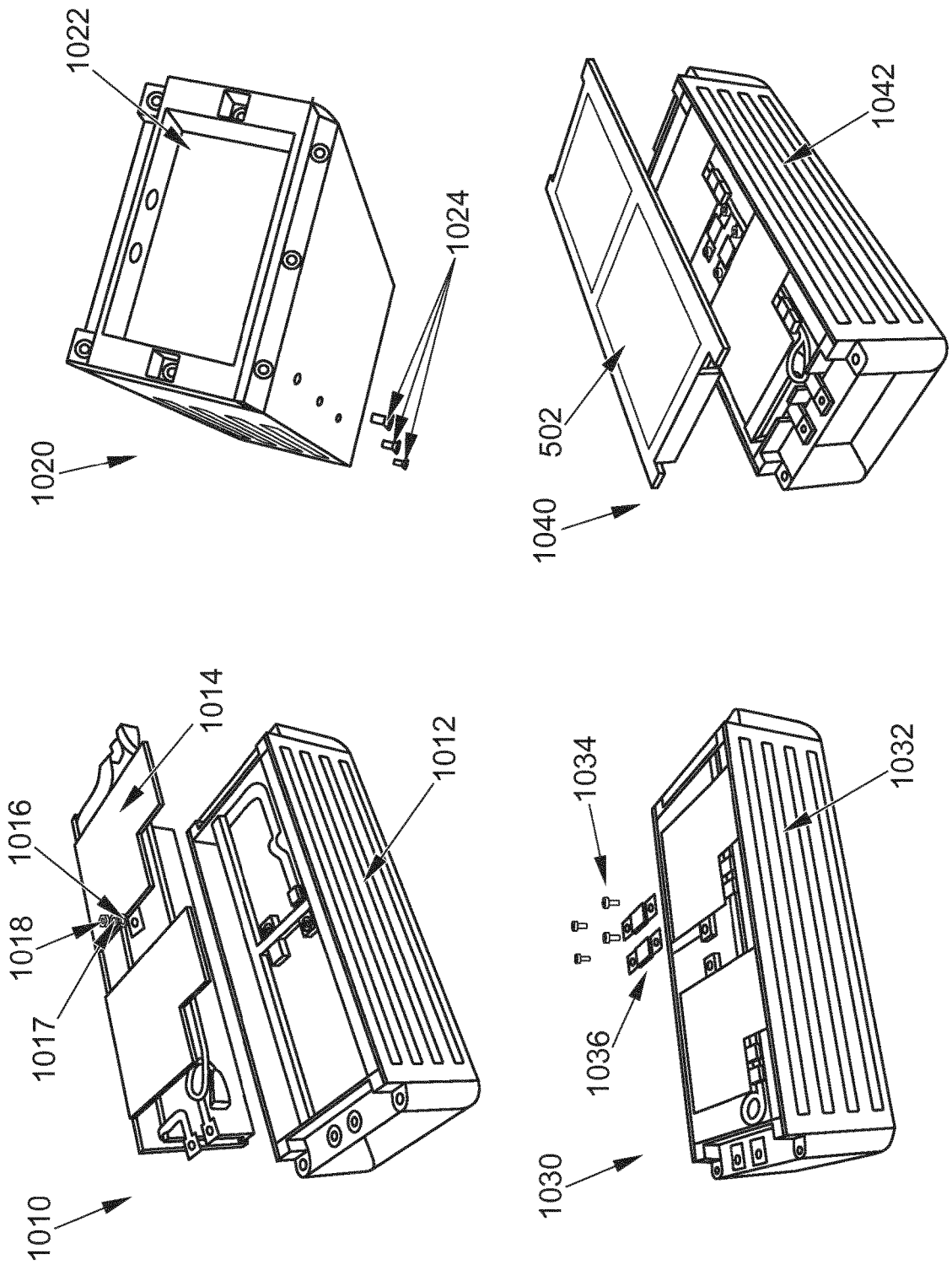

FIG. 10 uses a schematic depiction according to the embodiment of the method according to the invention to show a fourth course of assembly for assembling the module according to the invention.

DETAILED DESCRIPTION OF THE INVENTION

FIG. 1 uses a schematic depiction 100 according to an embodiment of the method according to the invention to show an arrangement of multiple prismatic energy cells 104 for fitting in a module housing provided according to the invention. A prismatic energy cell 104, which is a prismatic VDA standard cell, for example, has its flat side arranged with other prismatic energy cells to form a battery pack 102 and is connected up in series at the top by means of a cell connector 108. The two poles of the cell connector 108 are connected directly to the power electronics circuit board 106, which is arranged at the side in this instance, a different arrangement of the power electronics circuit board 106 also being conceivable. The arrangement shown allows better use of space and simplifies cell connection. The use of standardized energy cells in vehicle construction affords reliability in respect of availability and predetermined properties. The number of 14 energy cells that is shown results in a size of the battery pack 102 that corresponds to half the available installation space in a module housing. A resultant module voltage is sufficient to achieve a predetermined phase voltage.

FIG. 2 uses a schematic depiction 200 according to the embodiment of the method according to the invention to show a collection of all the subassemblies that are integrated or to be integrated in the module housing 202. A multiplicity of prismatic energy cells 104, each provided with a first thermally conductive element, in this instance a thermally conductive plate 204, are fitted together to form two battery packs and connected up in series by means of one cell connector frame 108 per battery pack. These components are inserted into the module housing 202 and shielded at the respective ends from a connection side by means of a foam plate 206. At one edge of a respective power electronics circuit board 106, a control circuit board 212 is mounted at right angles. While the two power electronics circuit boards 106 are inserted between the battery packs and a housing wall at the side, the two control circuit boards 212 come to rest on the cell connector frame 108 at is the top. A respective battery pack, or the energy storage units or energy cells 104 forming the respective battery pack, and a respective power electronics circuit board 106 have a respective second thermally conductive element in the form of a thermally conductive plate 208 arranged between them, said thermally conductive plate having an L-shaped termination at the lower edge. This L-shaped termination makes contact with a base of the module housing 202, which is connected to a flat cooling apparatus. Furthermore, a respective power electronics circuit board 106 and the housing wall of the module housing 202 have a respective third thermally conductive element in the form of a respective thermally conductive plate 210 arranged between them, on which thermally conductive plate there is likewise an L-shaped termination formed at the lower edge, which L-shaped termination makes contact with the base of the module housing 202 in the same way as for the other thermally conductive plate 208. In the depiction shown here, those sections of the respective L-shaped terminations of the thermally conductive plates 208 and 210 that make contact with the base of the module housing 202 are facing one another.

FIG. 3 uses a schematic depiction 300 according to the embodiment of the method according to the invention to show an assembly section for bolting together conductors and a respective power electronics circuit board 106. To improve visibility, the two lateral housing walls are not shown. Depicted resting on top are the two control circuit boards 212. Each of the power electronics circuit boards 106 has a respective conductor for positive and negative voltage routed to it. The conductors, which are arranged in a rail-like manner and for example made from copper sheet, are secured by means of threaded nuts 304 in the embodiment according to the invention that is shown.

FIG. 4 uses a schematic depiction 400 according to the embodiment of the method according to the invention to show an assembly section with integration of energy cells, power electronics circuit boards and control electronics circuit boards 212 in a module housing. The depiction 400 shown results when the individual components from the depiction 200 (see FIG. 2) have been assembled in the module housing 202. Each module housing 202 accommodates two multilevel converter modules, which result from the assembly of energy storage cells, power electronics circuit board, control circuit board and thermally conductive plates. It therefore provides space for all the subassemblies and connects them to form a unit. On the outside, the module housing 202 provides all the necessary interfaces, which can comprise a data connection, a power connection and various bolt points.

FIG. 5 uses a schematic depiction 500 according to the embodiment of the method according to the invention to show an assembled module. A housing cover 502 has been put onto the module housing 202.

FIG. 6 uses a schematic depiction 600 according to the embodiment of the method according to the invention to show multiple modules 602 arranged on a cold plate 604. The embodiment of the cold plate 604 that is shown is a liquid cold plate having supply and discharge connections 606.

FIG. 7 uses schematic depictions 710, 720, 730, 740 according to the embodiment of the method according to the invention to show a first course of assembly for assembling the module provided according to the invention. Assembly begins in depiction 710 with the module housing 202, which is formed from a U-shaped three-sided sheet metal bent part that is provided with a milled or injection molded connecting part made from plastic on each of the two opposite sides that have remained open, so that a box is obtained. A T-shaped interior wall structure 716 formed from two metal plates bolted to one another at right angles is then introduced into the box, said interior wall structure being bolted to a module base and a module side by means of countersunk bolts 712, with special washers 714 also being used in addition in the case of the module side. In depiction 720, a gap pad 722 is put on the inner side of the module base of the module housing 202, said gap pad having a high thermal conductivity and being able to fill interspaces between components. Thus prepared, depiction 730 involves two battery packs 102, which are made up of multiple energy storage cells, each provided with a thermally conductive plate having an L-shaped termination at the bottom edge on which the respective energy storage cell 104 is seated and which allows a transfer of heat via the gap pad to the module base, being introduced into the module housing 202. The battery packs 102 are each shielded from the respective connecting parts by means of a foam plate 206. In depiction 740, a flat foam part 742 is placed onto the top of each of the two battery packs 102 and the cell connector frame 108 is bolted to the interior wall structure 716 from depiction 710 by means of the bolts 744.

FIG. 8 uses a schematic depiction according to the embodiment of the method according to the invention to show a second course of assembly 810, 820, 830, 840 for assembling the module provided according to the invention. The cell connector frame 108 mounted in the assembly step 740 contains cutouts that accommodate a respective hexagonal nut 816, is a respective annular tongue 814, a respective shim 818 and a respective busbar 812 for connecting the energy storage cells in series. Additionally, simple eye rings for voltage measurement, special eye rings with an integrated temperature sensor and further shims are used here (not shown explicitly). The respective annular tongues 814 need to be situated at predefined points, for which purpose there is provision for cutouts directly in the cell connector frame 108. An arrangement according to the invention is shown by assembly step 820 with a plan view of the components shown in assembly step 810. In order to prevent a possible short circuit during the subsequent assembly steps, a long cell pole cover 832 and a short cell pole cover 834 are mounted over the connecting points for each battery pack in assembly step 830. To conclude this course of assembly, the two busbars 841 and 842 are also bolted together by means of a respective hexagonal nut 846, a respective annular tongue 844 and a respective shim 848 in 840. The module housing 202 is then fitted with two battery packs and ready to accommodate an electronic subassembly.

FIG. 9 uses a schematic depiction according to the embodiment of the method according to the invention to show a third course of assembly 910, 920, 930, 940 for assembling the module provided according to the invention. The electronic subassembly, including the second thermally conductive elements 924, 936, which are shown in the form of respective thermal plates in this instance, is preassembled outside the module housing 202. First, assembly step 910 involves two power electronics circuit boards 912 being connected to copper conductors 916 by means of cylindrical bolts 914 with nuts 918. Next, assembly step 920 involves a gap pad 926 being put on that side of the structure 922 that later faces a module housing interior wall and being covered with a thermally conductive plate 924. Cylindrical bolts 928 and 929 are put through respective holes in the preceding components. In the same way, contact is made between the other side of the power electronics circuit boards 932 and a further gap pad 934 and a further thermally conductive plate 936. The loose ends of the cylindrical bolts 928 and 929 are countered with nuts 937, 938 and 939 and all the components lying on top of one another are held together thereby. To conclude preassembly, assembly step 940 involves a respective control circuit board 944 being connected to a respective power electronics unit 942 provided with busbars and a thermally conductive plate. Moreover, a USB data cable 946 having a USB plug 947 is inserted into the sockets provided therefor on the respective control circuit board 944. A respective USB socket 948 is used for further connection to onboard electronics. This completes the electronic subassembly, which can be connected to the module housing 202 and to the battery packs integrated therein in the next step.

FIG. 10 uses a schematic depiction according to the embodiment of the method according to the invention to show a fourth course of assembly 1010, 1020, 1030, 1040 for assembling the module provided according to the invention. The electronic subassembly completed in assembly step 940, denoted by 1014 in assembly step 1010, is pushed in between the interior wall structure 716 and the structure 1012 having the module housing interior wall of the module housing and battery packs. The copper conductors of the electronic subassembly come to rest on the battery poles. The electronic subassembly is bolted together with the structure 1012 at the top by means of annular tongue, shim and bolt. In assembly step 1020, the electronic subassembly is bolted together with the structure 1022 having the module housing, battery packs and power electronics circuit board or control circuit board by means of bolts 1024 from the module base and coupled to the housing base inside the module by means of the gap pad 722 previously introduced in assembly step 720. In assembly step 1030, two fuses 1036 are also mounted on the structure 1032 by means of bolts 1034, and finally the assembly is concluded with assembly step 1040 by clipping the housing cover 502 onto the now finished structure 1042.

The invention claimed is:

1. A method for producing a mechanical and thermal system for a modular battery, the system having at least one module including (i) a box-like module housing, (ii) at least one energy storage unit, and (iii) at least one power electronics unit arranged on a flat power electronics circuit board and constituting a modular multilevel converter, said method comprising:
   connecting the at least one module, on at least one thermally conductive module side, to at least one flat cooling apparatus;
   forming a first thermal pathway connecting the at least one energy storage unit to the at least one flat cooling apparatus via at least one first thermally conductive element;
   forming a second thermal pathway connecting the at least one power electronics unit to the at least one flat cooling apparatus via at least one second thermally conductive element;
   wherein the first thermal pathway and second thermal pathway are discrete from one another;
   integrating the at least one energy storage unit and the at least one power electronics unit into the module housing;
   connecting the at least one energy storage unit to the at least one first thermally conductive element that contacts the at least one module side connected to the at least one flat cooling apparatus;
   arranging the at least one flat power electronics circuit board between the at least one energy storage unit and a housing interior wall of the module housing;
   arranging the at least one flat power electronics circuit board between two thermally conductive plates of the at least one second thermally conductive element; and
   positioning the two thermally conductive plates of the at least one second thermally conductive element within the module housing such that (i) one of the two thermally conductive plates is arranged between the at least one flat power electronics circuit board and the at least one energy storage unit, (ii) the two thermally conductive plates directly contact at least one module side connected to the at least one flat cooling apparatus, (iii) the two thermally conductive plates are oriented orthogonal to both the first thermally conductive element and the at least one energy storage unit, and (iv) the two thermally conductive plates overlap the at least one energy storage unit and further energy storage units that are stacked together along a stacking axis.

2. The method as claimed in claim 1, combining at least two energy storage units to form a battery pack in which the at least two energy storage units are arranged adjacently and connected in series with one another.

3. The method as claimed in claim 1, wherein the energy storage unit is either at least one battery cell in the form of a prismatic cell or at least one battery cell in the form of a round cell or at least one battery cell in the form of a pouch cell.

4. The method as claimed in claim 1, further comprising arranging at least one thermally insulating element in the module housing, wherein the interaction of at least one of the thermally conductive elements and the at least one thermally insulating element results in at least one cooling path that dissipates heat produced in the module housing to the module side that is connected to the cooling apparatus.

5. The method as claimed in claim 1, wherein a top and a bottom of the flat power electronics circuit board are each surrounded by one of the thermally conductive plates, and wherein the respective thermally conductive plate contacts the at least one module side connected to the cooling apparatus.

6. The method as claimed in claim 1, wherein a module base is one of the at least one module sides connected to the cooling apparatus.

7. The method as claimed in claim 1, further comprising arranging a control electronics unit in the form of a flat control circuit board opposite or at right angles to the power electronics circuit board along a housing interior wall of the module housing.

8. The method as claimed in claim 1, further comprising arranging the other of the thermally conductive plates of the at least one second thermally conductive element between the at least one flat power electronics circuit board and the interior wall of the module housing.

9. The method as claimed in claim 1, wherein the at least one flat power electronics circuit board is arranged in a space defined between the thermally conductive plates of the at least one second thermally conductive element.

10. The method as claimed in claim 4, wherein the at least one first and the at least one second thermally conductive elements are positioned on different sides of the at least one energy storage unit.

11. The method as claimed in claim 1, wherein each of said two thermally conductive plates are oriented to said at least one module side connected to the cooling apparatus.

* * * * *